United States Patent [19]
Lhonore et al.

[11] 3,869,253
[45] Mar. 4, 1975

[54] APPARATUS FOR PRODUCING NITROPARAFFINS

[75] Inventors: Pierre Lhonore, Douai; Guy Cohen, Paris; Bernard Jacquinot, Douai, all of France

[73] Assignee: Societe Chimique de la Grande paroisse, Azote et produits Chimiques, Paris, France

[22] Filed: Aug. 1, 1973

[21] Appl. No.: 384,508

Related U.S. Application Data
[62] Division of Ser. No. 299,173, Oct. 19, 1972, Pat. No. 3,780,115.

[52] U.S. Cl..................... 23/260, 23/284, 23/263, 23/266, 260/644, 260/688, 260/645
[51] Int. Cl........................... C07c 79/02, B01j 1/00
[58] Field of Search ............ 23/260, 284, 263, 266; 260/644, 688, 645, 646, 647

[56] References Cited
UNITED STATES PATENTS
2,291,345 7/1942 Rideout .............................. 260/644
2,511,454 6/1950 Bishop et al. .................... 260/688 X
2,621,205 12/1952 Doumani et al. ............... 260/647 X
2,844,634 7/1958 McKinnis ........................... 260/644

Primary Examiner—James H. Tayman, Jr.
Attorney, Agent, or Firm—Browdy and Neimark

[57] ABSTRACT

The invention relates to an process for the production of nitroparaffins from hydrocarbons higher than methane, by nitration with nitrogen peroxide in the presence of oxygen, introduced in the form of air, wherein the nitration is carried out at a pressure which is between 8 and approximately 14 bars, the reactant gases being preheated under the reaction pressure and introduced into the reaction zone between 150° and 330°C, the gaseous effluents originating from the nitration zone being subjected to a rapid cooling or quenching.

10 Claims, 1 Drawing Figure

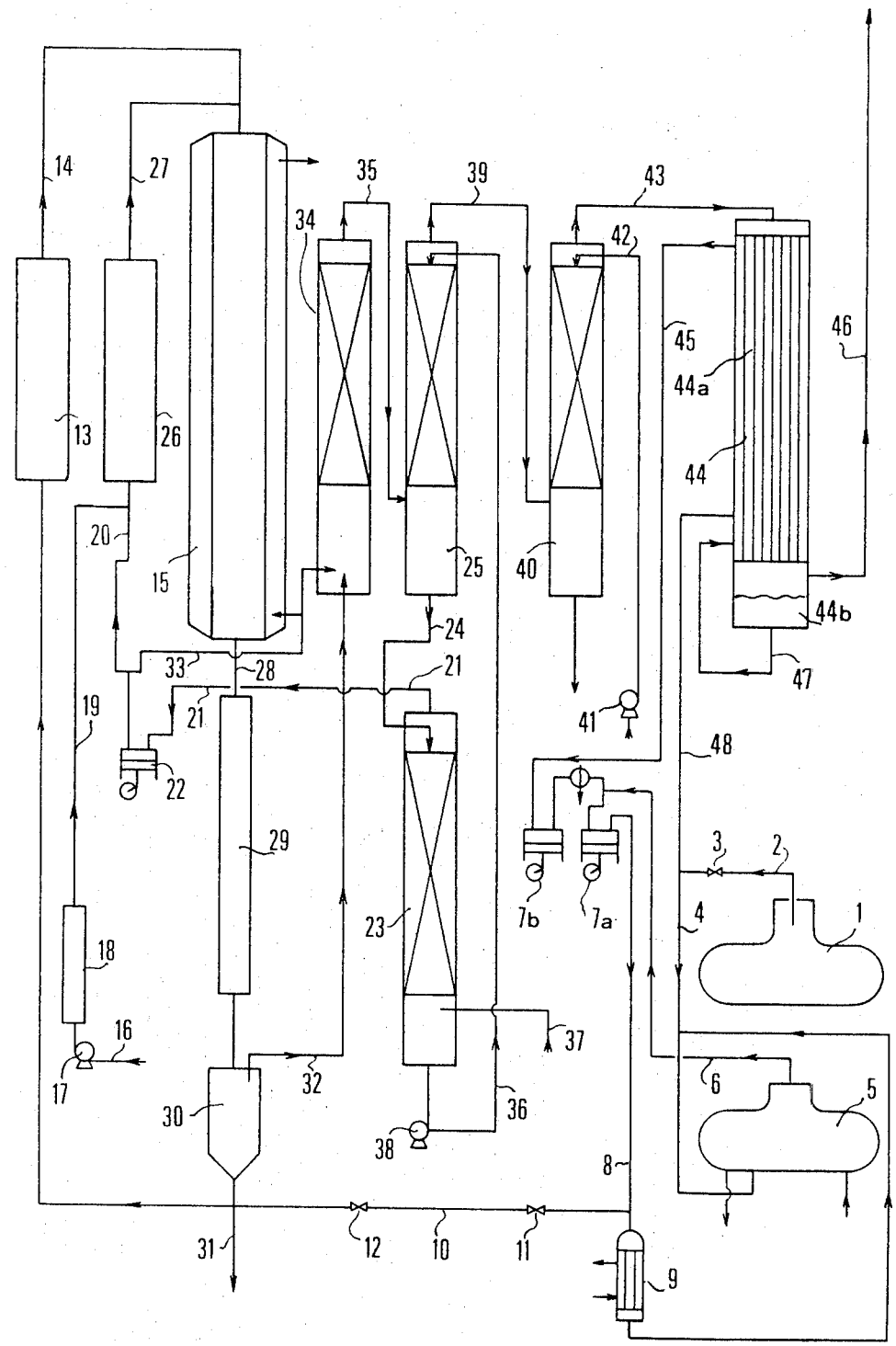

APPARATUS FOR PRODUCING NITROPARAFFINS

This is a division, of application Ser. No. 299,173, filed Oct. 19, 1972, now U.S. Pat. No. 3,780,115.

The present invention relates to the production of nitroparaffins from hydrocarbons higher than methane, particularly propane, by nitration with nitrogen peroxide.

Processes which are based on the nitration of alkanes by nitrogen peroxide are already known, but the interest of such processes is limited, because the yields with respect to the nitrogen peroxide are not very high.

An improved process and apparatus for the nitration of the hydrocarbon, particularly in the presence of oxygen, introduced in the form of air, has now been found according to the present invention, in which the nitration is carried out under a pressure which is between 8 and 14 bars, the reactant gases being preheated under the reaction pressure and introduced into the reaction zone between 150° and 330°C, the gaseous effluents coming from the nitration zone being subjected to a rapid cooling or quenching.

The nitration reaction is advantageously carried out under a pressure which is between approximately 9 and 12 bars.

According to one method of carrying out the invention, firstly the hydrocarbon and secondly the air mixed with the nitrogen peroxide are preheated beforehand.

The new conditions as regards production under pressure lead to a shortening of the contact time of the reactants which are present, the reduction factor being mediately after nitration permits an improvement in the quality and in the selectivity of the prepared nitroparaffins, while avoiding any undesirable nitration in liquid phase. This cooling on egress must be effected without condensation of propane, so as to avoid any danger of explosion between the liquid propane and the nitrogen peroxide.

It has been found that a suitable choice of the air/propane and nitrogen peroxide/propane ratios enables liquid propane not to be present at the time of the condensation of the effluents, thereby obtaining best possible yields by weight of produced nitroparaffins.

For quenching temperatures which are between approximately + 3 and 17°C and as a function of reaction pressures which are between 8 and 14 bars, the ratios by volume between air and propane are respectively between 0.18 to 0.31 and 0.89 to 1.53, and the ratios by volume between nitrogen peroxide and propane are respectively between 0.19 to 0.21 and 0.29 to 0.31.

Preferably, the said ratios are chosen so that the ratios by volume between air and propane and nitrogen peroxide/propane are respectively between 0.25 to 0.49 and 0.40 0.80 and 0.22 to 0.23 and 0.26 to 0.27.

The following table gives the possible and preferred variations in the ratios by volume between air and propane and between nitrogen peroxide and propane as a function of the pressure for condensation temperatures which are between + 3 and + 17°C approximately, which permit the best possible yields to be obtained.

| Pressure in bars | Ratio air/propane | | | | Ratio nitrogen peroxide/propane | | | |
|---|---|---|---|---|---|---|---|---|
| | | Preferred | | | | Preferred | | |
| | from | from | to | to | from | from | to | to |
| 8  | 0.18  | 0.25 | 0.40 | 0.89 | 0.19 | 0.22 | 0.26 | 0.29 |
| 9  | 0.2   | 0.3  | 0.5  | 1.0  | 0.19 | 0.22 | 0.26 | 0.29 |
| 10 | 0.22  | 0.35 | 0.5  | 1.11 | 0.19 | 0.22 | 0.26 | 0.29 |
| 11 | 0.245 | 0.39 | 0.6  | 1.22 | 0.20 | 0.22 | 0.27 | 0.3  |
| 12 | 0.265 | 0.43 | 0.7  | 1.33 | 0.20 | 0.22 | 0.27 | 0.3  |
| 13 | 0.290 | 0.46 | 0.75 | 1.44 | 0.20 | 0.23 | 0.27 | 0.3  |
| 14 | 0.310 | 0.49 | 0.80 | 1.53 | 0.21 | 0.23 | 0.27 | 0.31 | of the order of 60 to 100. Under the same temperature conditions, about 320°C, at atmospheric pressure, the contact times are from 10 to 20 minutes; under a pressure of 10 bars, the reaction times are shortened to about 9 to 10 seconds.

Furthermore, the nitration under pressure permits a reduction in the volume and consequently in the size of the equipment.

On the other hand, under the same temperature conditions, the nitration under pressure permits a different distribution the final products to be obtained, with a very distinct tendency towards the nitropropanes. Thus, under the same temperature conditions of about 320°C at the time of introduction, the nitration of the propane under atmospheric pressure leads to a distribution, as a percentage by weight, which is as follows: 56% of nitromethane, 17% of nitroethane, 9.3% of 1-nitropropane and 17.7% of 2-nitropropane, whereas the nitration under 10 bars permits 25.8% of nitromethane, 6.2% of nitroethane, 12.7% of 1-nitropropane and 55.3% of 2-nitropropane to be obtained.

It has also been discovered that a very rapid and energetic cooling, known as quenching, of the gases im- When the nitration is effected in the presence of oxygen, the introduction in the form of air is of interest, because the nitrogen ballast avoids the condensation of the propane.

It is also particularly advantageous to preheat the reactants: propane, nitrogen peroxide and air, before they are used in the reaction and preferably at the reaction temperature and pressure. According to one method of carrying out the process of the invention, on the one hand the propane and on the other hand the air mixed with the nitrogen peroxide are previously and separately heated.

An improved and advantageous process for recycling the nitrogen peroxide has also been found. The gaseous effluents, after quenching and separation of the products which can be condensed, have air added to them so as to permit the re-oxidation of the nitrogen dioxide, a degradation product of the nitrogen peroxide, the said reformed nitrogen peroxide being absorbed by the nitric acid and then recycled after denitration of the acid.

The denitration of the nitric acid is effected by degasification with air. In an integrated installation, the air originating from the degasification is recycled.

The absorption of the nitrogen peroxide by nitric acid can with advantage be followed by a washing by means of an alkaline solution which eliminates the last traces of nitrogen oxides.

According to the invention, after elimination of the nitrogen oxides, the residual propane is condensed after drying and the liquid obtained is degasified for eliminating the CO, $CO_2$, nitrogen and oxygen which cannot be condensed. The propane is then vaporized by expansion. This gaseous propane at low pressure is then compressed to the reaction pressure and thereafter reinjected into the reaction circuit after preheating. The propane vaporized by expansion provides the cold units necessary for the preceding condensation, a supply of propane from store completing the necessary quantity of cold units.

Other features and advantages of the present process will become apparent from the description of one installation for manufacturing nitroparaffins from propane by nitration with nitrogen peroxide.

The installation can be divided into three main sections:
1. A synthesis section operating under the reaction pressure,
2. A section for distillation of the nitroparaffins,
3. A section for recovering and recycling the reactants, operating under synthesis pressure.

The installation in which the nitration of the propane with nitrogen peroxide is effected according to the invention comprises a vaporizer in which the nitrogen peroxide is vaporized under the reaction pressure, then a combined vaporizer superheater in which the nitrogen peroxide is preheated in the presence of air previously compressed in a compressor to the pressure of the reaction. It also comprises a preheater, in which the propane, compressed beforehand in a compressor to the reaction pressure, is preheated to the introduction temperature and comprises, in addition, a reactor into which are introduced the preheated reactants and the nitration reaction takes place. The reactor is immediately followed by a two-stage rapid cooler. Two phases are condensed: an aqueous phase and an organic phase containing the nitroparaffins. In a separator, the liquid phase is separated from the aqueous phase. The gases go to the recovery and recycling section, while the liquids are expanded and sent to the distillation section.

This section comprises a preliminary washing subsection, itself formed of a first decantation, in which is effected the separation of the organic phase and the rejection of the water of reaction. The organic phase is washed with a sodium bisulphite solution, for example, a 10% solution. It is subjected to a fresh decantation and then to washing with water. A final decantation separates the nitroparaffins, which are stored, awaiting distillation.

The distillation can possibly function as successive operations. First the nitromethane is separated, then the 1-nitropropane, and the nitroethane and 2-nitropropane mixture is separated and the constituents are isolated.

According to the invention, the recovery and recycling installation comprises a concentrated nitric acid scrubbing column, in which the acid circulates in counter-current to the gaseous effluents. According to one advantageous embodiment, the installation can comprise a degasifying column, in which the nitric acid having absorbed the nitrogen peroxide is denitrated with air, the air charged with nitrogen peroxide being recycled towards the compressor which precedes the combined vaporizer superheater for the mixture of nitrogen peroxide and air. The nitric acid circulates in a closed circuit between the scrubbing and degasifying columns.

According to one object of the invention, the installation also comprises a column for scrubbing the gases with an alkaline solution. This scrubbing column may possibly precede a vaporizer condenser designed for recovering, after condensation, the residual propane in the effluent gases and to re-integrate it into the production circuit.

Furthermore, the installation can advantageously comprises a boiler, in which the propane is vaporized, followed by a propane condenser.

The nitration is carried out at a pressure of 9 bars at an introduction temperature of 280°C.

The reaction mixture has approximately the following composition, expressed as gaseous volume:

| | |
|---|---|
| Propane | 61 % |
| Nitrogen peroxide | 14.5 % |
| Air | 24.5 %. |

The propane, coming from the storage reservoir 1 and circulating in the piping system 2, along which is interposed the valve 3, is divided into two fractions: the fraction circulating in the conduit 4 is then vaporized in the boiler 5. This vaporised propane is carried by way of the conduit 6 to the second stage 7a of the propane compressor, which delivers through the pipeline 8 under a pressure of 15 bars. A part of this propane is condensed in the condenser 9 and sent to the main storage position.

The propane is drawn off in the gaseous state at 15 bars, through the pipeline 10, with a rate of flow of 484 kg/h. This propane is expanded to 9 bars and its rate of flow is regulated after passage into the expansion valves 11 and 12. It is then preheated in the preheater 13 to 280°C and introduced through the pipeline 14 into the reactor 15, at the hourly rate of 242 m3, i.e., 484 kg.

The nitrogen peroxide originating from the storage position through the pipeline 16 is compressed to liquid by the pump 17 at 9 bars, then vaporized in the electric vaporizer 18, which it leaves in gaseous form at 100°C. This peroxide flowing through the pipeline 19, is mixed with air at 20. The air which has been carried by the pipeline 21 and drawn in through the compressor 22 has served for degasifying, in the degasifying column 23, the concentrated nitric acid containing dissolved nitrogen peroxide, coming by way of the pipeline 24 from the nitric acid scrubbing column 25. The compressor 22 delivers at 9 bars and 100°C. The mixture of air and nitrogen peroxide, which has taken place at 20, is superheated in the combined vaporizer and superheater 26 up to 280°C and hourly there are introduced 20 m³ of oxygen, 80 m³ of nitrogen and 60 m³, i.e., 123.4 kg/h of nitrogen peroxide into the reactor 15 by way of the pipeline 27.

The gaseous effluents withdrawn through the pipeline 28 and having the composition:

| | | |
|---|---|---|
| oxygen | 2.9 | m3/hour |
| nitrogen | 89 | m3/hour |
| $C_2H_6$ | 6.1 | m3/hour |
| $C_3H_8$ | 222 | m3/hour |
| CO | 6.1 | m3/hour |

| | |
|---|---|
| CO₂ | 11.2 m3/hour |
| NO | 15.2 m3/hour |
| H₂O | 77 m3/hour |
| HNO₃ | 3.2 kg/hour |
| nitromethane | 14.8 kg/hour |
| nitroethane | 5.5 kg/hour |
| 1-nitropropane | 8.2 kg/hour |
| 2-nitropropane | 30.6 kg/hour. | are cooled in the two-stage rapid cooler 29, in which the gases are subjected to a quenching from 10°C to about 5°C. The rapid cooler utilizes, for a part, not shown, super-cooled water obtained at the boiler 5. The condensates are separated in the separator 30 and the liquid nitroparaffins are drawn off at 31. The composition of the liquid phase is as follows:

| | |
|---|---|
| H₂O | 61.6 kg |
| HNO₃ | 3.2 kg |
| nitromethane | 14.76 kg |
| nitroethane | 5.46 kg |
| 1-nitropropane | 8.14 kg |
| 2-nitropropane | 30.56 kg |

The gases leaving by way of the pipeline 32 receive air from the compressor 22 through the pipeline 33, in the oxidizing tower 34, in which is effected the oxidation of the nitrogen monoxide NO into NO₂. On leaving the tower through the conduit 35, the composition of the gases is as follows:

| | | |
|---|---|---|
| oxygen | 3.76 | m3/hour |
| nitrogen | 118.6 | m3/hour |
| ethane | 6.1 | m3/hour |
| propane | 222 | m3/hour |
| CO | 6.1 | m3/hour |
| CO₂ | 11.2 | m3/hour |
| NO | 1.1 | m3/hour |
| NO₂ | 14.1 | m3/hour |
| H₂O | 1.3 | m3/hour |

The reformed nitrogen peroxide is fixed in the concentrated nitric acid scrubbing column 25. The nitric acid is introduced into the scrubbing column through the conduit 36. After washing and dissolution of the NO₂, the acid is drawn off through the conduit 24 and introduced at the top of the degasifying column 23, where it is degasified by the air arriving by way of 37. After denitration, the nitric acid is pumped into 38 and circulates in the conduit 36, where it is re-introduced at the upper level of the scrubbing column 25. The air leaves the degasifying column 23 through the conduit 21 and is introduced into the reaction circuit at the intake of the air compressor 22.

The gaseous effluents, largely freed from NO₂, with the composition:

| | | |
|---|---|---|
| oxygen | 3.7 | m3/hour |
| nitrogen | 118.6 | m3/hour |
| C₂H₆ | 6.1 | m3/hour |
| C₃H₈ | 222 | m3/hour |
| CO | 6.1 | m3/hour |
| CO₂ | 11.2 | m3/hour |
| NO | 0.8 | m3/hour |
| NO₂ | 0.7 | m3/hour |
| H₂O | 0.5 | m3/hour |
| HNO₃ | 1.1 | m3/hour | and leaving the top of the nitric acid scrubbing column 25 through the conduit 39, reach the soda scrubbing column 40. The soda, after pumping at 41, is introduced through the pipeline 42 into the upper part of the column 40.

The gases containing the propane which has not reacted, N₂, CO, CO₂ and O₂ (propane 222 m3/h, nitrogen 118.6 m3/h, oxygen 3.7 m3/h, carbon monoxide 6.1 m3/h) at 28°C and a pressure of 9 bars, leave the column 40 and pass through the conduit 43 into the propane vaporizer-condenser 44. After vaporization, the propane leaves the vaporizer 44a at the top through the conduit 45 at 20°C/1.5 bars; the N₂, CO, CO₂ and O₂ which cannot be condensed are eliminated through the conduit 46. The propane condensed in the condenser part 44b of the vaporizer condenser 44 leaves the condenser at 24°C and is re-introduced through the conduit 47 at the base of the vaporizer 44a. The propane condensed at 10 bars is revaporized at 1.5 bars; a fraction coming from the storage position (1) through the conduit 48 is vaporized at the same time, so, as to ensure the quantity of cold units which are necessary for the condensation.

The vaporizer propane in the conduit 45 is compressed in the first stage of the compressor 7b and is mixed with the propane vaporized at 5 bars, coming from the boiler 5.

The yield, calculated by weight relatively to the nitrogen peroxide, allowing for the recycled peroxide, is respectively for each nitroparaffin:

| | |
|---|---|
| 2-nitropropane | 26.8 % |
| 1-nitropropane | 6.1 % |
| nitroethane | 3.5 % |
| nitromethane | 18.2 %. |

What we claim is:

1. An apparatus for the production of nitroparaffins from propane by nitration with nitrogen peroxide in the presence of oxygen introduced in the form of air, comprising:
   a reaction vaporizer means for vaporizing nitrogen peroxide;
   a combined vaporizer and superheater means connected to said reaction vaporizer means for preheating nitrogen peroxide coming from said reaction vaporizer means together with compressed air to a predetermined temperature;
   preheater means for heating compressed propane to a predetermined temperature;
   reactor means, connected to said combined vaporizer and superheater means and said preheater means, for receiving the preheated nitrogen peroxide, air and propane and in which takes place the nitration reaction;
   rapid cooler means connected to said reactor means, for cooling the effluent from said reactor means;
   separator means connected to said cooler means for separating liquid nitroparaffins from the remaining gaseous effluents from said cooler means;
   concentrated nitric acid scrubbing column means connected to said separator means for circulating concentrated nitric acid counter-currently with the gaseous effluents from said separator means; and
   degasifying means, connected to said scrubbing column means, for denitrating the nitric acid used in said scrubbing column means by degasification with compressed air, said nitric acid circulating in closed circuit between said scrubbing column means and said degasifying means.

2. An apparatus in accordance with claim 1 further including means for feeding the compressed air used in said degasifying means to said combined vaporizer and superheater means as the source of compressed air therefor.

3. An apparatus in accordance with claim 1 further including an alkaline solution scrubbing column means, connected to said nitric acid scrubbing column means, for circulating alkaline solution counter-currently with the gaseous effluents from said nitric acid scrubbing column means.

4. An apparatus in accordance with claim 3 further including a vaporizer-condenser means connected to said alkaline solution scrubbing column means for separating condensed propane from the gaseous effluents from said alkaline solution scrubbing column means.

5. An apparatus in accordance with claim 4 further including recirculation means including a compressor for recirculating the condensed propane from said vaporizer-condenser means for use as the source of propane in said preheater means.

6. An apparatus in accordance with claim 1 further including means for maintaining the pressure in said combined vaporizer and superheater means, said preheater means and said reactor means between approximately 8 and 14 bars.

7. An apparatus in accordance with claim 1 further including means for introducing the preheated propane, nitrogen peroxide and air into said reaction chamber in air/propane and nitrogen peroxide/propane ratios at which no liquid propane is formed during condensation of the effluents by cooling at the quenching temperature and the reaction pressure.

8. An apparatus in accordance with claim 1 wherein said rapid cooler means is for quenching the effluents from said reactor means at a temperature of 3° – 17°C.

9. An apparatus in accordance with claim 1, wherein said combined vaporizer and superheater means and said preheater means are both for heating their contents to the same temperatures.

10. An apparatus in accordance with claim 1, wherein said combined vaporizer and superheater means and said preheater means are both for heating their contents to between 150° and 330°C.

* * * * *